W. O. STRONG.

Improvement in Egg-Carriers.

No. 128,920.

Patented July 9, 1872.

Scale: Natural Size.

128,920

UNITED STATES PATENT OFFICE.

WILLIAM O. STRONG, OF YPSILANTI, MICHIGAN, ASSIGNOR TO JANE M. STRONG, OF SAME PLACE.

IMPROVEMENT IN EGG-CARRIERS.

Specification forming part of Letters Patent No. 128,920, dated July 9, 1872.

SPECIFICATION.

I, WILLIAM O. STRONG, of Ypsilanti, Washtenaw county and State of Michigan, have invented a certain machine or contrivance, of which the following is a specification:

*Nature and Object of the Invention.*

The invention has for its object not only the safe transportation of eggs in large quantities, but also, and chiefly, the self-emptying or discharging faculty, which is secured by the combination or arrangement of the projected wires and the double bottom of the tray with the clamps which hold together or loosen the same, as may be desired, for retaining or discharging the egg.

*Description of Accompanying Drawing.*

Figure 1:
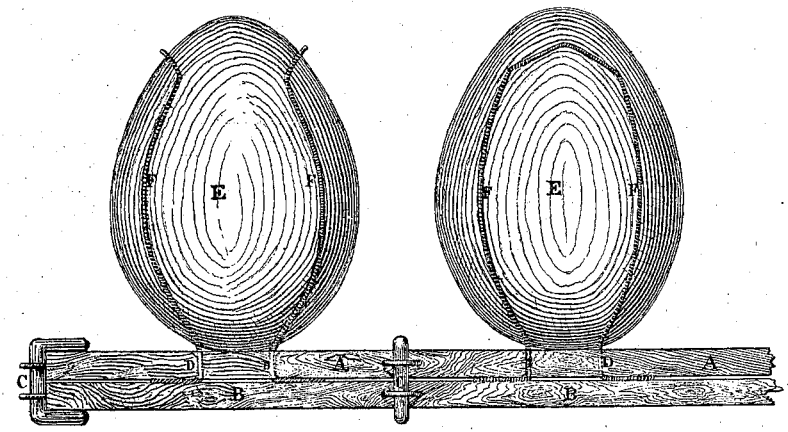
Figure 2:
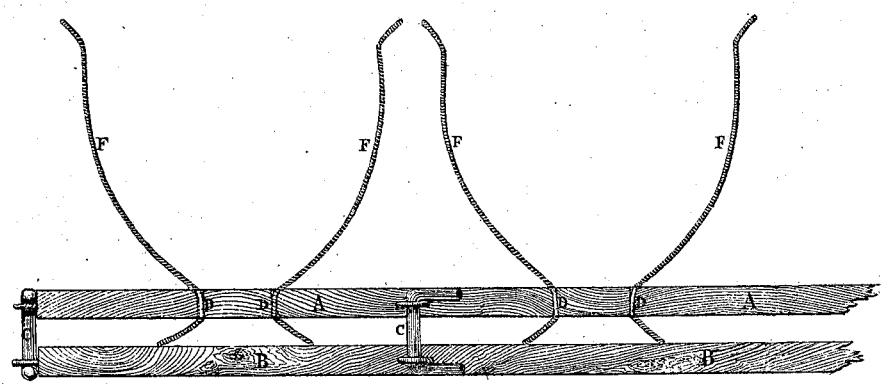

Figure 1 is a front view of the tray, with the egg in position for transportation, the two bottoms being brought together and held by the clamps, which are turned so as to hold them together, contracting the wires at the same time around the egg. Fig. 2 shows the tray in position for discharging the eggs, the clamps being turned off and the wires relaxed by the dropping of the lower bottom.

*General Description.*

A is the frame or upper bottom of the tray, through which the wires F F F F are passed at the points D D. B is the lower bottom of the tray, held or attached to the upper bottom by the clamps C C, which may be attached at either end, or at one end and in the middle of A and B, as shown in Fig. 2. C C are the clamps or hooks by which the trays are opened or held together. D D are holes or openings through which the wires pass in the upper section of the tray. E E show the egg in position, and ready for transportation. F F are the wires, shaped as in Fig. 1, with ends projecting below the upper section of the tray, so as to be operated upon by the lower section or bottom of the tray, when brought in contact with the upper by means of the clamp. In Fig. 2 these wires are shown in a relaxed position after the tray is inverted and the eggs discharged.

The number of the egg-holders may be more or less, according to the length of the trays, and these may be arranged in tiers above each other in such form of box, rack, or frame, as the party manufacturing them may desire. It will thus be seen by the combination above described of wires bent and passing through the upper tray in such manner that, by pressure of the under plate with the upper, a leverage is formed which holds the egg in place, and when the pressure is relaxed, by unclasping the wire-clamps after the tray is inverted, the eggs will drop out of their own weight, thus forming a self-emptying or self-discharging egg-carrier.

I hereby distinctly disclaim all and everything in the above-described egg-carrier which may have been embraced in or covered by the patent issued by the United States to Francis Arnold on the 14th of August, 1855, and numbered 13,414, which "egg-carrier," it will be seen, lacks the self-discharging or self-emptying faculty.

*Claim.*

I claim—

The combination of the double bottoms A A and B B with the projecting ends of the wires F F through the holes D D and the clamps C C, substantially as and for the purpose above set forth.

W. O. STRONG.

Witnesses:
    D. BETHUNE DUFFIELD,
    WILLIAM C. MAYBURY.